(12) United States Patent
Okimoto et al.

(10) Patent No.: US 12,237,518 B2
(45) Date of Patent: Feb. 25, 2025

(54) CYLINDRICAL BATTERY

(71) Applicant: SANYO Electric Co., Ltd., Daito (JP)

(72) Inventors: Ryota Okimoto, Osaka (JP); Oose Okutani, Hyogo (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 528 days.

(21) Appl. No.: 17/614,754

(22) PCT Filed: May 26, 2020

(86) PCT No.: PCT/JP2020/020656
§ 371 (c)(1),
(2) Date: Nov. 29, 2021

(87) PCT Pub. No.: WO2020/241610
PCT Pub. Date: Dec. 3, 2020

(65) Prior Publication Data
US 2022/0231357 A1    Jul. 21, 2022

(30) Foreign Application Priority Data

May 31, 2019  (JP) ................................. 2019-102022

(51) Int. Cl.
*H01M 50/107* (2021.01)
*H01M 50/186* (2021.01)

(52) U.S. Cl.
CPC ....... *H01M 50/107* (2021.01); *H01M 50/186* (2021.01)

(58) Field of Classification Search
CPC . H01M 50/107; H01M 50/167; H01M 50/186
See application file for complete search history.

(56) References Cited

U.S. PATENT DOCUMENTS

| 2018/0097215 A1 | 4/2018 | Cho et al. |
| 2018/0108878 A1 | 4/2018 | Fees et al. |

(Continued)

FOREIGN PATENT DOCUMENTS

| JP | 2002-93382 A | 3/2002 |
| JP | 2005-293922 A | 10/2005 |

(Continued)

OTHER PUBLICATIONS

Extended (Supplementary) European Search Report dated Oct. 11, 2022, issued in counterpart EP application No. 20815065.6. (9 pages).

(Continued)

*Primary Examiner* — Karie O'Neill Apicella
(74) *Attorney, Agent, or Firm* — WHDA, LLP

(57) ABSTRACT

A cylindrical battery having a bottomed cylindrical outer can including a bottom surface part and a side surface part; a sealing body that closes an opening part of the outer can; and a gasket disposed between the outer can and the sealing body. The outer can has: a groove part that is formed such that a side surface section thereof extends from the outside to the inside and supports the sealing body with the gasket therebetween; and a shoulder part that is formed to face the groove part with the sealing body and the gasket therebetween and sandwiches the sealing body together with the groove part. At least a portion of the shoulder part extends radially inward of the sealing body from an inner end of the groove part, and an easily deformable part is formed on the shoulder part along the circumferential direction of the outer can.

5 Claims, 6 Drawing Sheets

(56) References Cited

U.S. PATENT DOCUMENTS

| | | | |
|---|---|---|---|
| 2019/0148683 A1 | | 5/2019 | Kwon et al. |
| 2019/0273223 A1 | | 9/2019 | Seefeldt et al. |
| 2020/0091469 A1 | * | 3/2020 | Sodeyama .......... H01M 50/152 |

FOREIGN PATENT DOCUMENTS

| | | | |
|---|---|---|---|
| JP | 2009-152031 A | | 7/2009 |
| JP | 2010-512638 A | | 4/2010 |
| JP | 2012-234716 A | | 11/2012 |
| JP | 2019-153580 A | | 9/2019 |
| WO | 2008/072841 A1 | | 6/2008 |
| WO | WO-2018225394 A1 * | 12/2018 | ............ H01M 10/04 |

OTHER PUBLICATIONS

English translation of Office Action dated Jan. 20, 2023, issued in counterpart CN Application No. 202080032532.7. (5 pages).
International Search Report dated Aug. 4, 2020, issued in counterpart International Application No. PCT/JP2020/020656 (2 pages).

* cited by examiner

CYLINDRICAL BATTERY

TECHNICAL FIELD

The present disclosure relates to a cylindrical battery.

BACKGROUND ART

There are conventionally widely known cylindrical batteries which comprise a bottomed cylindrical exterior can, a sealing assembly closing an opening of the exterior can, and a gasket arranged between the exterior can and the sealing assembly (for example, refer to PATENT LITERATURES 1 and 2). In general, in the exterior can, there are formed a grooved part which has a lateral surface part caused to project to the inside from the outside and supports the sealing assembly via the gasket, and a shoulder part which is formed so as to face the grooved part and pinches and holds the sealing assembly via the gasket together with the grooved part. In order to secure a sealing property inside the battery, the shoulder part is crimped onto the peripheral edge of the sealing assembly.

In the cylindrical battery, a positive electrode lead is connected to an inner surface of the sealing assembly and the sealing assembly becomes a positive electrode external terminal, and a negative electrode lead is connected to an inner surface of the exterior can and the exterior can becomes a negative electrode external terminal, for example.

CITATION LIST

Patent Literature

PATENT LITERATURE 1: Japanese Unexamined Patent Application Publication No. 2009-152031
PATENT LITERATURE 2: Japanese Translation of PCT International Application Publication No. 2010-512638

SUMMARY

Technical Problem

There can be a case where a plurality of cylindrical batteries are connected in series via external leads to form a module. In this case, the external leads are connected to positive electrode external terminals and negative electrode external terminals. There can be a case where, in order to make a battery module small in size, external leads are connected to the shoulder parts of the exterior cans as the negative electrode external terminals, the shoulder parts being close to the sealing assemblies. In this case, although it can be considered that the shoulder part is elongated in order to make the area of connection of the external lead on the shoulder part large to improve workability of connection of leads, simply elongating the shoulder part causes the grooved part to readily deform to the electrode assembly side (lower side of the exterior can) in crimping the shoulder part. Such deformation of the grooved part can result in problems such as narrowing a space for housing the electrode assembly, and causing the grooved part to come into contact with the electrode assembly, which results in short circuit between those.

Solution to Problem

A cylindrical battery which is an aspect of the present disclosure comprises: a bottomed cylindrical exterior can including a bottom surface part and a lateral surface part; a sealing assembly closing an opening of the exterior can; and a gasket arranged between the exterior can and the sealing assembly, wherein the exterior can has a grooved part that is formed such that the lateral surface part is caused to project to an inside from an outside and that supports the sealing assembly via the gasket, and a shoulder part that is formed so as to face the grooved part via the sealing assembly and the gasket and that pinches and holds the sealing assembly together with the grooved part, and at least part of the shoulder part extends more to an inner side of the sealing assembly in a radial direction than an inner end of the grooved part, and a readily deforming part is formed in the shoulder part along a circumferential direction of the exterior can.

Advantageous Effects of Invention

According to the cylindrical battery which is an aspect of the present disclosure, the shoulder part may be caused to extend more to the inner side of the sealing assembly in the radial direction than the inner end of the grooved part while the grooved part is restrained from deforming. Thereby, the area of connection of the external lead on the shoulder part may be sufficiently secured, and workability of connection of leads may be improved when cylindrical batteries are made into a module.

DESCRIPTION OF EMBODIMENTS

Hereafter, an example of embodiments of a cylindrical battery according to the present disclosure will be described in detail with reference to the drawings. In the present specification, as to the wording "substantially . . . ", "substantially parallel", for its exemplary explanation, means any of the state of being completely parallel and the state considered as being substantially parallel.

Figure 1:
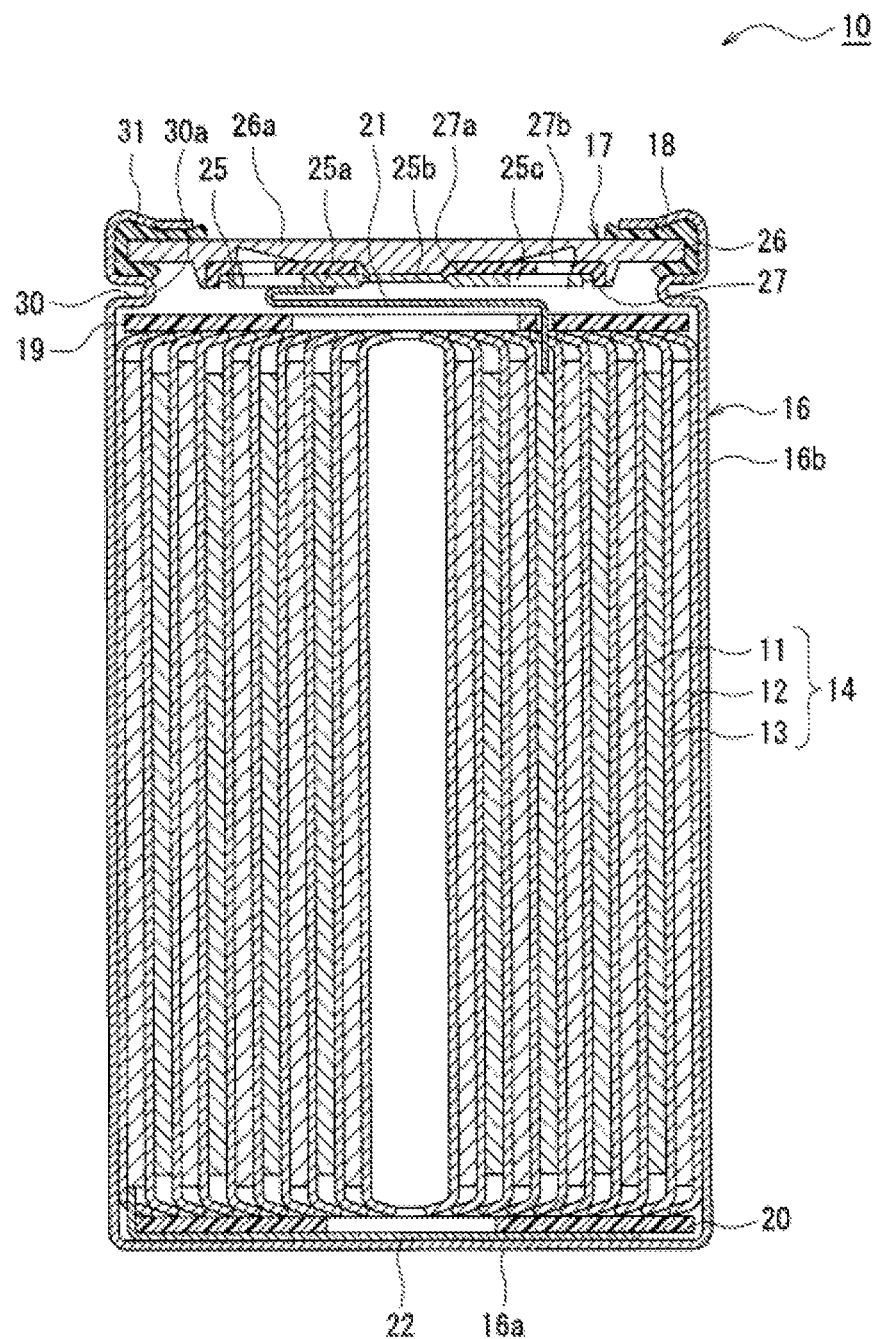
FIG. 1 is a sectional view of a cylindrical battery which is an example of embodiments.

FIG. 1 is a sectional view of a cylindrical battery 10 which is an example of embodiments. As exemplarily shown in FIG. 1, the cylindrical battery 10 comprises an electrode assembly 14, an electrolyte, and an exterior can 16 housing the electrode assembly 14 and the electrolyte. The electrode assembly 14 includes a positive electrode 11, a negative electrode 12, and a separator 13, and has a structure in which the positive electrode 11 and the negative electrode 12 are wound into a spiral shape via the separator 13. The exterior can 16 has a bottomed cylindrical shape one end of which in the axial direction is opened, and the opening of the exterior can 16 is closed by a sealing assembly 17. Moreover, a gasket 18 is interposed between the exterior can 16 and the sealing assembly 17. Hereafter, the sealing assembly 17 side (opening side of the exterior can 16) of the cylindrical battery 10 is described as being on the upside, and a bottom surface part 16a side of the exterior can 16 is described as being on the downside, for convenience of description.

The positive electrode 11 has a positive electrode current collector and a positive electrode mixture layer formed on at least one of surfaces of the electrode current collector. For the positive electrode current collector, there can be used metallic foil, of aluminum, aluminum alloy, or the like, stable in the potential range of the positive electrode 11, a film having the metal disposed in the surface layer, and the like. The positive electrode mixture layer includes a positive electrode active material, a conductive agent such as acetylene black, and a binder such as polyvinylidene fluoride, and is preferably formed on both surfaces of the positive electrode current collector. For the positive electrode active material, there is used lithium-transition metal composite oxide, for example. The positive electrode 11 can be produced by applying positive electrode mixture slurry including the positive electrode active material, the conductive agent, the binder, and the like on the positive electrode current collector, drying the coating film, and after that, compressing the coating film to form the positive electrode mixture layer on both surfaces of the electrode current collector.

The negative electrode 12 has a negative electrode current collector and a negative electrode mixture layer formed on at least one of surfaces of the electrode current collector. For the negative electrode current collector, there can be used metallic foil, of copper, copper alloy, or the like, stable in the potential range of the negative electrode 12, a film having the metal disposed in the surface layer, and the like. The negative electrode mixture layer includes a negative electrode active material and a binder such as styrene-butadiene rubber (SBR), and is preferably formed on both surfaces of the negative electrode current collector. For the negative electrode active material, there can be used graphite, silicon-containing compounds, and the like, for example. The negative electrode 12 can be produced by applying negative electrode mixture slurry including the negative electrode active material, the binder, and the like on the negative electrode current collector, drying the coating film, and after that, rolling the coating film to form the negative electrode mixture layer on both surfaces of the electrode current collector.

For the electrolyte, a non-aqueous electrolyte is used, for example. The non-aqueous electrolyte includes a non-aqueous solvent and an electrolyte salt dissolved in the non-aqueous solvent. For the non-aqueous solvent, there can be used esters, ethers, nitriles, amides, mixed solvents of two kinds or more of these, and the like. The non-aqueous solvent may contain a halogen-substituted substance having halogen atom(s) such as fluorine substituted for at least part of hydrogens of these solvents. Note that the non-aqueous electrolyte is not limited to a liquid electrolyte but may be a solid electrolyte. For the electrolyte salt, there can be used lithium salts such as $LiPF_6$, for example. The kind of the electrolyte is not specially limited but may be an aqueous electrolyte.

The cylindrical battery 10 comprises insulating plates 19 and 20 arranged on the upside and the downside of the electrode assembly 14, respectively. In the example shown in FIG. 1, a positive electrode lead 21 connected to the positive electrode 11 extends to the sealing assembly 17 side through a through hole of the insulating plate 19, and a negative electrode lead 22 connected to the negative electrode 12 extends to the bottom surface part 16a side of the exterior can 16 through the outside of the insulating plate 20.

The positive electrode lead 21 is connected onto a lower surface of an internal terminal plate 25 which is a bottom plate of the sealing assembly 17 by welding or the like, and an external terminal plate 26 of the sealing assembly 17 electrically connected to the internal terminal plate 25 is a positive electrode external terminal. The negative electrode lead 22 is connected onto an inner surface of the bottom surface part 16a of the exterior can 16 by welding or the like, and the exterior can 16 is a negative electrode external terminal.

As mentioned above, the cylindrical battery 10 comprises the exterior can 16, the sealing assembly 17 closing the opening of the exterior can 16, and the gasket 18 arranged between the exterior can 16 and the sealing assembly 17. The exterior can 16 is a bottomed cylindrical metal-made container including a bottom surface part 16a and a lateral surface part 16b. The bottom surface part 16a exhibits a disc shape, and the lateral surface part 16b is formed into a cylinder shape along the outer peripheral edge of the bottom surface part 16a. Moreover, the exterior can 16 has a circular opening, and the sealing assembly 17 is formed into a disc shape corresponding to the opening. The gasket 18 secures a sealing property inside the battery and secures electric insulation between the exterior can 16 and the sealing assembly 17.

The exterior can 16 has a grooved part 30 which is formed such that the lateral surface part 16b is caused to project to the inside from the outside and which supports the sealing assembly 17 via the gasket 18, and a shoulder part 31 which is formed so as to face the grooved part 30 via the sealing assembly 17 and the gasket 18 and which pinches and holds the sealing assembly 17 together with the grooved part 30. The grooved part 30 is formed into an annular shape along the circumferential direction of the exterior can 16 (lateral surface part 16b) by spinning processing from the outside of the lateral surface part 16b.

Similarly to the grooved part 30, the shoulder part 31 is formed into an annular shape along the circumferential direction of the exterior can 16. The shoulder part 31 is formed by folding the opening edge part of the exterior can 16 inward, and is crimped onto the peripheral edge of the sealing assembly 17 via the gasket 18. Its details mentioned later, at least part of the shoulder part 31 extends more to the inner side of the sealing assembly 17 in the radial direction than an inner end 30a of the grooved part 30, and a readily deforming part 34 (refer to FIG. 2) is formed in the shoulder part 31 along the circumferential direction of the exterior can 16.

The sealing assembly 17 is a disc-shaped member comprising a current interruption mechanism. The sealing assembly 17 has a structure in which the internal terminal plate 25, the insulating plate 27, and the external terminal plate 26 are stacked sequentially from the electrode assembly 14 side. The internal terminal plate 25 is a metal plate including an annular part 25a to which the positive electrode lead 21 is connected, and a thin center part 25b which is separated from the annular part 25a when an internal pressure of the battery exceeds a predetermined threshold. Vent holes 25c are formed in the annular part 25a.

The external terminal plate 26 is arranged to face the internal terminal plate 25, these interposing the insulating plate 27. In the insulating plate 27, an opening 27a is formed at the center part in the radial direction, and vent holes 27b are formed at respective portions overlapping with the vent holes 25c of the internal terminal plate 25. The external terminal plate 26 has a vent part 26a which fractures when the internal pressure of the battery exceeds a predetermined threshold, and the vent part 26a is connected to the annular part 25a of the internal terminal plate 25 via the opening 27a of the insulating plate 27 by welding or the like. The insulating plate 27 insulates the annular part 25a of the internal terminal plate 25 and the vent part 26a of the external terminal plate 26 from each other at the portion except the connection portion of those.

The vent part 26a includes a downward projection protruding toward the inner side of the battery, and a thin part formed around the downward projection, and is formed at the center pat of the external terminal plate 26 in the radial direction. In the cylindrical battery 10, by electrically connecting the internal terminal plate 25 to which the positive electrode lead 21 is connected and the external terminal plate 26 together, there is formed a current path connecting from the electrode assembly 14 to the external terminal plate 26. When the internal pressure rises upon occurrence of abnormality in the battery, the internal terminal plate 25 fractures, the center part 25b is separated from the annular part 25a, and the vent part 26a deforms so as to be convex toward the outside of the battery. Thereby, the current path is interrupted. When the internal pressure of the battery further rises, the vent part 26a fractures to form a discharge port for gas.

Note that the structure of the sealing assembly is not limited to the structure exemplarily shown in FIG. 1. The sealing assembly may have a stack structure including two vent members or may have a convex sealing assembly cap covering the vent members. Moreover, the negative electrode lead may be connected to the inner surface of the sealing assembly and the positive electrode lead may be connected to the inner surface of the exterior can. In this case, the sealing assembly is the negative electrode external terminal and the exterior can is the positive electrode external terminal.

For example, a plurality of cylindrical batteries 10 are connected in series to be made into a module. In a battery module including the plurality of cylindrical batteries 10, external leads are connected to the sealing assembly 17 and the shoulder part 31 of the exterior can 16 by welding or the like. When an external lead is connected to the shoulder part 31 of the exterior can 16, the module can be made smaller in size as compared with the case where an external lead is connected to the bottom surface part 16a of the exterior can 16. Since in the cylindrical battery 10, at least part of the shoulder part 31 extends to be elongated more to the inner side of the sealing assembly 17 in the radial direction than the inner end 30a of the grooved part 30, the area of connection of the external lead on the shoulder part 31 can be sufficiently secured, and workability of connection of leads is improved to improve the yield.

Figure 2:
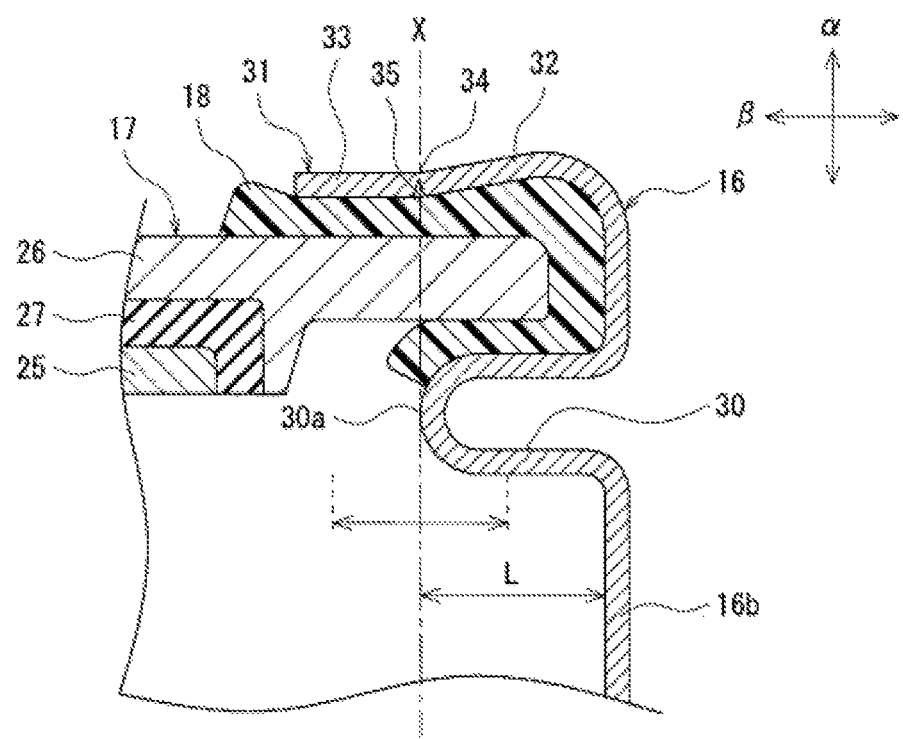
FIG. 2 is an expanded view of a shoulder part of an exterior can and its vicinity in FIG. 1.

Hereafter, referring to FIG. 2, there are described in detail the shoulder part 31 of the exterior can 16 and the structure around it. FIG. 2 is an expanded view of the shoulder part 31 and its vicinity in FIG. 1.

As exemplarily shown in FIG. 2, the sealing assembly 17 is pinched and held by the grooved part 30 and the shoulder part 31 which are formed in the lateral surface part 16b of the exterior can 16. The grooved part 30 has, at an upper part of the exterior can 16, a part of the lateral surface part 16b caused to project to the inside from the outside, and is formed into an annular shape along the circumferential direction of the lateral surface part 16b. Moreover, the grooved part 30 has a substantially U-shaped cross section. The sealing assembly 17 is arranged on the upper surface of the grooved part 30 via the gasket 18.

A length L of the grooved part 30 is 1 mm to 3 mm, for example. Here, the length L of the grooved part 30 means a length along the radial direction β of the exterior can 16 from the inner surface of the exterior can 16 along the axial direction α to the inner end 30a of the grooved part 30. When the length L of the grooved part 30 is in the aforementioned range, the sealing assembly 17 can be stably supported while mechanical strength of the exterior can 16 is being secured.

The shoulder part 31 is formed into an annular shape along the opening edge part (upper end part) of the exterior can 16. The shoulder part 31 is formed by folding the lateral surface part 16b in the direction toward the sealing assembly 17 arranged on the upper surface of the grooved part 30 such that the opening edge part of the exterior can 16 faces the grooved part 30 via the sealing assembly 17 and the gasket 18. The shoulder part 31 presses the sealing assembly 17 via the gasket 18 by being crimped onto the peripheral edge of the sealing assembly 17. In the present embodiment, in plan view of the cylindrical battery 10, the shoulder part 31 in the annular shape having a fixed width is formed on the peripheral edge of the sealing assembly 17. Note that the end part, of the shoulder part 31, on the outer periphery side is curved toward the outside of the battery.

As mentioned above, at least part of the shoulder part 31 extends more to the inner side of the sealing assembly 17 in the radial direction than the inner end 30a of the grooved part 30. That is, in the shoulder part 31, there are a facing part 32 which faces the grooved part 30 via the sealing assembly 17 and the gasket 18, and an extending part 33 that does not face the grooved part 30, and extends more to the inner side of the sealing assembly 17 in the radial direction than the inner end 30a of the grooved part 30. The length of the extending part 33 along the radial direction β of the exterior can 16 may be not less than the length L of the grooved part 30 but is preferably shorter than the length L. The length of the extending part 33 is 10% to 60% of the length L of the grooved part 30, for example, and is 0.2 mm to 2 mm by way of example.

In the present embodiment, the shoulder part 31 formed into an annular shape extends, across its total length in the circumferential direction, more to the inner side of the sealing assembly 17 in the radial direction than the inner end 30a of the grooved part 30. In other words, the extending part 33 of the shoulder part 31 is formed into an annular shape.

In the shoulder part 31, there is formed the readily deforming part 34 along the circumferential direction of the exterior can 16. The readily deforming part 34 is a portion which deforms more readily than another portion of the shoulder part 31 when the shoulder part 31 is crimped onto the sealing assembly 17, and stress of the crimping tends to concentrate thereat and is to be folded more readily than the other portions. In other words, the readily deforming part 34 is a portion that has the smallest yield stress and is to deform most readily on a cross section of the shoulder part 31 along the radial direction β of the exterior can 16.

As shown with a comparative example mentioned later, when a shoulder part is formed to have a length exceeding the inner end of a grooved part, reaction force from the grooved part falls below the stress in crimping, and there can arise problems such as downward warping of the grooved part to the electrode assembly side, which causes a housing space for the electrode assembly to be small, and contact of the grooved part with the electrode assembly, which results in short circuit. In this case, there is spoiled the balance between the stress in crimping and the reaction force from the grooved part. With the cylindrical battery 10, by forming the readily deforming part 34 in the shoulder part 31 to allow the shoulder part 31 to deform in crimping, stress acting on the grooved part 30 can be reduced. Therefore, even when the extending part 33 is formed in the shoulder part 31, the grooved part 30 can be restrained from deforming.

The shoulder part 31 is preferably inclined such that its distance from the grooved part 30 becomes smaller as coming closer to the readily deforming part 34 from the end part on the outer periphery side. In the present embodiment, the facing part 32 of the shoulder part 31 is inclined toward the downside such that its distance from the grooved part 30 becomes smaller, in other words, its distance from the upper surface of the sealing assembly 17 becomes smaller as coming from the inner end of the curved part formed at the end part, of the shoulder part 31, on the outer periphery side to the readily deforming part 34. In this case, the gasket 18 is strongly pressed by the shoulder part 31, which can secure an excellent sealing property inside the battery.

On the other hand, the portion of the shoulder part 31 positioned more on the tip side than the readily deforming part 34 is preferably formed to be substantially parallel to the radial direction β of the exterior can 16. When the shoulder part 31 is crimped, the shoulder part 31 bends at the readily deforming part 34 and is put into the state where the portion of the shoulder part 31 positioned more on the tip side than the readily deforming part 34 is along the radial direction β. That is, there exists a bent part in the shoulder part 31, and the portion positioned more to the tip side than the bent part, such, for example, as a part of or the entirety of the extending part 33, is formed to be substantially parallel to the radial direction β. By forming at least part of the extending part 33 to be substantially parallel to the radial direction β, the stress acting on the grooved part 30 can be reduced, and moreover, an external lead can be readily connected to the shoulder part 31. Furthermore, by making the inclination angle of the facing part 32 small, the external lead can be readily connected to the shoulder part 31. For example, the inclination angle of the facing part 32 may be set to be substantially parallel to the radial direction β of the exterior can 16.

In the mode exemplarily shown in FIG. 2, there is formed, in the shoulder part 31, an annular groove 35 along the circumferential direction of the exterior can 16. Although the groove 35 may be formed on the outer surface of the shoulder part 31, it is preferably formed on the inner surface, of the shoulder part 31, in contact with the gasket 18. The groove 35 is formed to have a V-shaped cross section with a depth of 10% to 90% of the thickness of the shoulder part 31, for example. A portion of the shoulder part 31 where the groove 35 is formed is thinner than the other portions, and is to deform more readily than the other portions due to concentration of the stress when the shoulder part 31 is crimped onto the sealing assembly 17. That is, the portion where the groove 35 is formed is the readily deforming part 34, and the readily deforming part 34 in an annular shape is formed across the total length of the shoulder part 31 (exterior can 16) in the circumferential direction.

The readily deforming part 34 (groove 35) is preferably formed in a range of a length corresponding to 50% of the length L of the grooved part 30 in the radial direction β of the exterior can 16 from a position on the shoulder part 31 overlapping with the inner end 30a of the grooved part 30 in the axial direction α of the exterior can 16 as a center X. For example, when the length L of the grooved part 30 is 2 mm, the readily deforming part 34 is formed in a range of ±1 mm from the center X in the radial direction β. By forming the readily deforming part 34 in the relevant range, the stress acting on the grooved part 30 in crimping can be sufficiently reduced, and the grooved part 30 can be highly restrained from deforming.

The readily deforming part 34 is still preferably formed in a range of a length corresponding to 30% of the length L of the grooved part 30 from the aforementioned center X of the shoulder part 31 in the radial direction β, specially preferably formed in a range of a length corresponding to 15% of the length L. In the present embodiment, the inner end 30a of the grooved part 30 and the readily deforming part 34 substantially line up in the axial direction α. That is, the readily deforming part 34 is formed, in the shoulder part 31, in a portion substantially overlapping with the inner end 30a of the grooved part 30 in the axial direction α. The readily deforming part 34 is formed at a boundary position between the facing part 32 and the extending part 33, and the whole extending part 33 is formed to be substantially parallel to the radial direction β of the exterior can 16.

Figure 3:
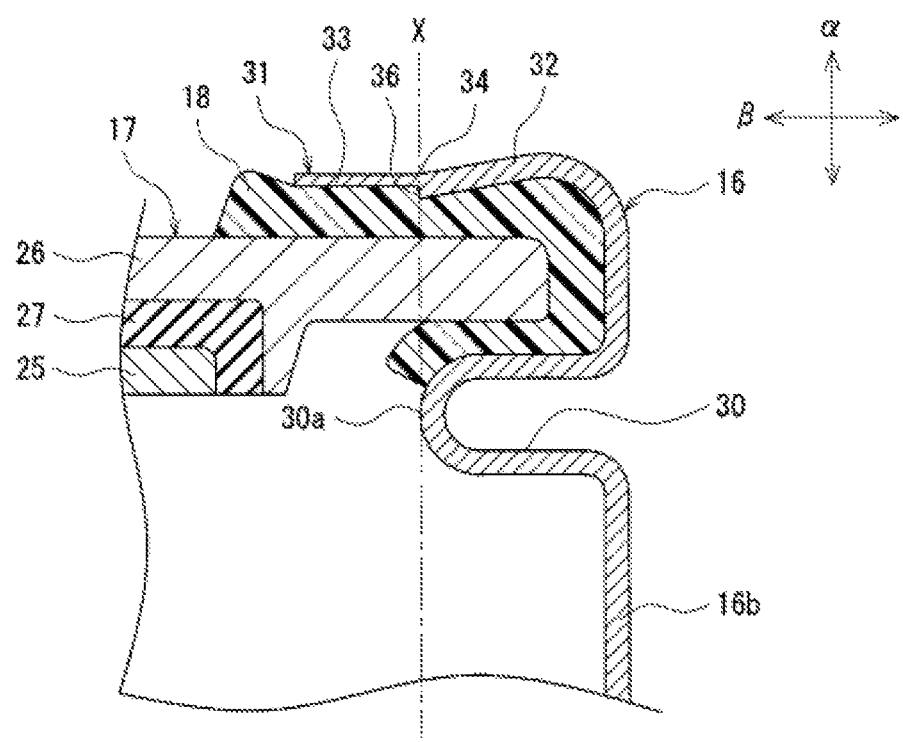
FIG. 3 is a sectional view of a cylindrical battery which is another example of embodiments.

As exemplarily shown in FIG. 3, a step 36 may be formed, in the shoulder part 31, into an annular shape along the circumferential direction of the exterior can 16. The step 36 is preferably formed in a range of a length corresponding to 50% of the length L of the grooved part 30 in the radial direction β of the exterior can 16 from the position on the shoulder part 31 overlapping with the inner end 30a of the grooved part 30 in the axial direction α of the exterior can 16 as the center X, similarly to the groove 35. In the example shown in FIG. 3, the step 36 is formed, in the shoulder part 31, in a portion substantially overlapping with the inner end 30a of the grooved part 30 in the axial direction α. In this case, the portion of the shoulder part 31 where the step 36 is formed is the readily deforming part 34.

In the mode exemplarily shown in FIG. 3, the step 36 (readily deforming part 34) is formed at the boundary position between the facing part 32 and the extending part 33, the shoulder part 31 bends at the relevant boundary position, and the whole extending part 33 is formed to be substantially parallel to the radial direction pi of the exterior can 16. Moreover, the thickness of the extending part 33 is smaller than the thickness of the facing part 32, and is not more than 70% of the thickness of the facing part 32, for example. Note that the groove 35 may also be formed at the position overlapping with the step 36 while the step 36 is formed in the shoulder part 31 to make at least part of the extending part 33 thin.

Figure 4A:
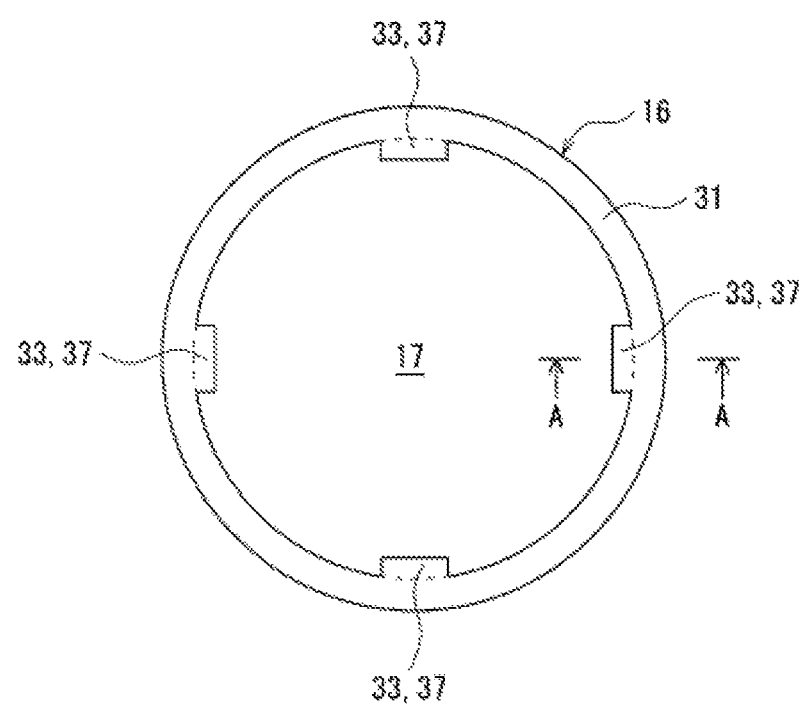
FIG. 4A is a plan view of a cylindrical battery which is another example of embodiments.
Figure 4B:
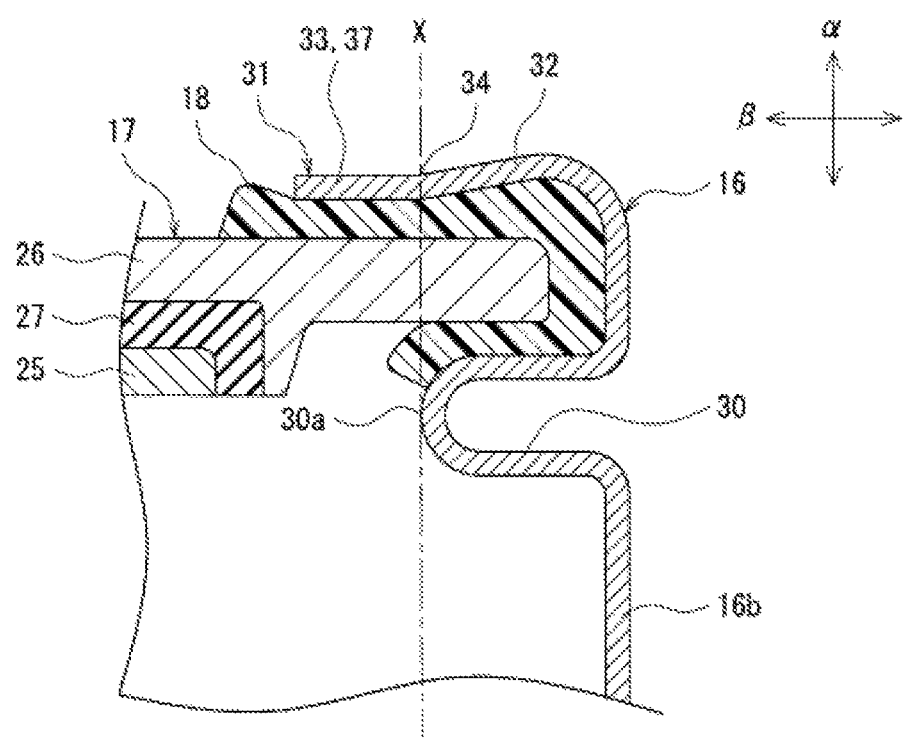
FIG. 4B is a view partially showing a cross section taken along the AA line in FIG. 4A.

FIG. 4A is a plan view showing another example of embodiments (the gasket 18 is omitted from the illustration), and FIG. 4B is a view partially showing a cross section taken along the AA line in FIG. 4A. As exemplarily shown in FIG. 4A and FIG. 4B, the shoulder part 31 may have at least one projection 37 which protrudes more to the inner side of the sealing assembly 17 in the radial direction than the inner end 30a of the grooved part 30. In the example shown in FIG. 4A and FIG. 4B, a plurality of (four) projections 37 are formed at the same intervals in the circumferential direction of the shoulder part 31 formed into an annular shape. In this case, the base portions of the projections 37 are the readily deforming parts 34.

The readily deforming parts 34 formed at the base portions of the projections 37 are preferably formed at the similar positions to that of the readily deforming part 34 shown in FIG. 2 and FIG. 3. In the example shown in FIG. 4A and FIG. 4B, the projections 37 protrude from portions substantially overlapping with the inner end 30a of the grooved part 30 in the axial direction α to the inner side of the sealing assembly 17 in the radial direction, and the entirety of each of the projections 37 is the extending part 33. Moreover, the base portions of the projections 37 bend, and the entirety of each of the projections 37 is formed to be substantially parallel to the radial direction β of the exterior can 16. The length (width) of each of the projections 37 along the circumferential direction of the shoulder part 31 is preferably short in such a range that it does not affect the connection to the external lead, and is twice or less the length L of the grooved part 30, for example.

EXAMPLES

While the disclosure will be hereafter further described with examples, the present disclosure is not limited to these examples.

Example 1

[Production of Positive Electrode]

As the positive electrode active material, a lithium-transition metal composite oxide expressed by the general formula, $LiNi_{0.8}Co_{0.15}Al_{0.05}O_2$, was used. The positive electrode active material, polyvinylidene fluoride, and acetylene black were mixed in a solid component mass ratio of 100:1.7:2.5, and N-methyl-2-pyrrolidone (NMP) was used as a dispersion medium to prepare the positive electrode mixture slurry. Next, this positive electrode mixture slurry was applied onto both surfaces of a positive electrode current collector composed of aluminum foil except for the connection portion to a positive electrode lead, the coating film was dried and compressed, and after that, was cut to have a predetermined electrode size to produce a positive electrode. Here, the positive electrode lead made of aluminum underwent ultrasonic welding to the exposed part of the positive electrode current collector.

[Production of Negative Electrode]

As the negative electrode active material, readily graphitizable carbon was used. The negative electrode active material, polyvinylidene fluoride, and carboxymethylcellulose were mixed in a solid component mass ratio of 100: 0.6:1, and water was used as a dispersion medium to prepare the negative electrode mixture slurry. Next, this negative electrode mixture slurry was applied onto both surfaces of a negative electrode current collector composed of copper foil except for the connection portion to a negative electrode lead, the coating film was dried and compressed, and after that, was cut to have a predetermined electrode size to produce a negative electrode. Here, the negative electrode lead composed of a Ni—Cu—Ni cladding material underwent ultrasonic welding to the exposed part of the negative electrode current collector.

[Preparation of Non-Aqueous Electrolytic Solution]

$LiPF_6$ was dissolved in a mixed solvent of ethylene carbonate (EC), diethyl carbonate (DEC), and ethyl methyl carbonate (EMC) to have 1.0 mol/L of concentration to prepare a non-aqueous electrolytic solution.

[Production of Cylindrical Battery]

The aforementioned positive electrode and the aforementioned negative electrode were wound into a spiral shape via a polyolefin-made separator to produce a winding-type electrode assembly. This electrode assembly was inserted into a bottomed tubular exterior can produced by drawing processing of a steel plate via a disc-shaped insulating plate for the bottom of the can, and was welded onto the inner surface of the bottom surface part. Next, an insulating plate was inserted above on the electrode assembly, and a grooved part having a substantially U-shaped cross section was formed more on the upper end side of the exterior can than the insulating plate. The grooved part had a lateral surface part of the exterior can caused to project to the inside from the outside, and was formed into an annular shape along the circumferential direction of the exterior can. Next, the aforementioned non-aqueous electrolytic solution was injected into the exterior can, and the positive electrode lead was welded onto the internal terminal plate of the sealing assembly. After that, the sealing assembly was arranged on the grooved part via the gasket with the positive electrode lead being folded. The opening edge part of the exterior can was crimped onto the peripheral edge of the sealing assembly via the gasket thereby to form the shoulder part and to form a cylindrical battery in which the shoulder part extended more to the inner side of the sealing assembly in the radial direction than the inner end of the grooved part.

In the shoulder part (0.25 mm of thickness), there was formed an annular groove (0.1 mm of depth) along the circumferential direction of the exterior can in a portion overlapping with the inner end of the grooved part in the axial direction of the exterior can. Moreover, an extending part which was positioned more on the tip side of the shoulder part than the groove was formed into an annular shape to be substantially parallel to the radial direction of the exterior can, and its length was 0.5 mm. Here, a portion (facing part) which faces the grooved part via the sealing assembly and the gasket was inclined such that its distance from the grooved part became smaller as coming closer to the groove, from the inner end of the curved part formed at the end part on the outer periphery side to the groove.

Example 2

A cylindrical battery was produced similarly to Example 1 except that an annular step was formed in place of the annular groove in the shoulder part. The thickness of the facing part was set to 0.25 mm and the thickness of the extending part was set to 0.15 mm.

Example 3

A cylindrical battery was produced similarly to Example 1 except that projections (0.5 mm of length; 2 mm of width) protruding more to the inner side of the sealing assembly in the radial direction than the inner end of the grooved part were formed in place of the annular extending part in the shoulder part. Four projections were formed at the same intervals in the circumferential direction of the shoulder part.

Comparative Example 1

A cylindrical battery was produced similarly to Example 1 except that the annular groove as the readily deforming part was not formed in the shoulder part.

[Observation of Cross Section of Grooved Part]

Figure 5:
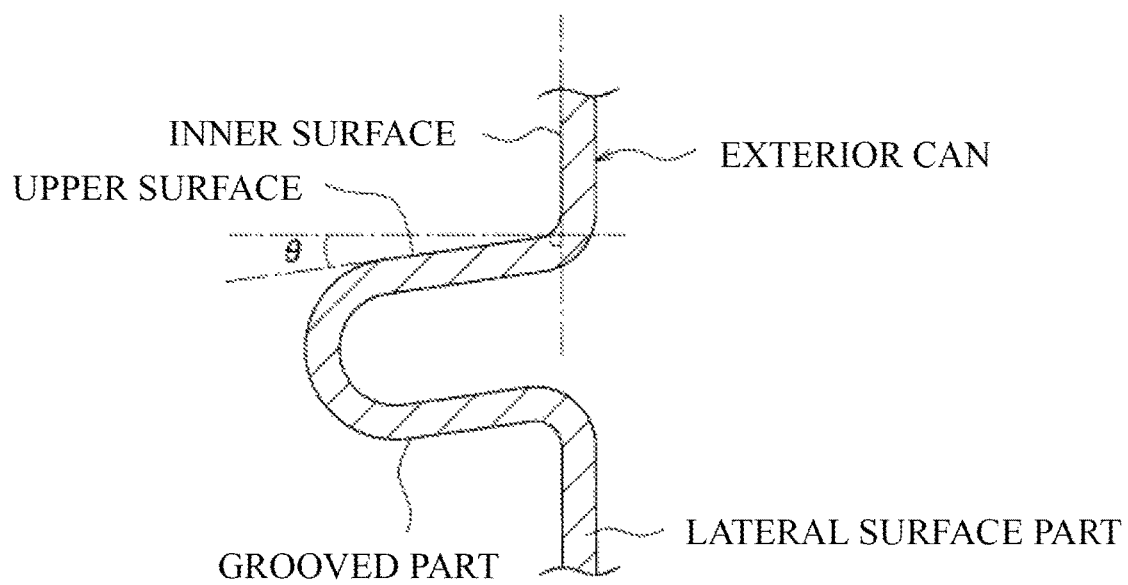
FIG. 5 is a view of deformation of a grooved part occurring in a cylindrical battery.

For each of the batteries of the examples and the comparative example, after an epoxy resin was injected into an upper part of the battery and solidified, the upper part of the battery was cut along the axial direction of the exterior can. For each battery, a sectional shape of the grooved part was observed, and as shown in FIG. 5, a downward warping angle θ of the upper surface of the grooved part was measured. The angle θ is an inclination angle relative to the direction perpendicular to the inner surface of the lateral surface part along the axial direction of the exterior can, and it is meant that the extent of deformation of the grooved part is larger as the angle θ is larger.

The measurement results for the angle θ are as follows.
Example 1: 0° to 0.5°
Example 2: 0° to 1°
Example 3: 1° to 2°
Comparative Example 1: 4° to 6°

It is clear from the aforementioned evaluation results that any of the batteries of the examples shows a smaller downward warping angle θ of the grooved part and a smaller extent of deformation of the grooved part as compared with the battery of the comparative example. According to the batteries of the examples, the shoulder part can be caused to extend more to the inner side of the sealing assembly in the radial direction than the inner end of the grooved part while restraining the grooved part from deforming. Therefore, the area of connection of the external lead on the shoulder part can be sufficiently secured while the grooved part not causing a problem such as its contact with the electrode assembly, which results in short circuit. On the other hand, as in the comparative example, simply elongating the shoulder part largely causes deformation of the grooved part, which raises the risk of the short circuit.

REFERENCE SIGNS LIST 10 cylindrical battery, 11 positive electrode, 12 negative electrode. 13 separator, 14 electrode assembly, 16 exterior can, 16a bottom surface part. 16b lateral surface part. 17 sealing assembly, 18 gasket, 19, 20 insulating plate, 21 positive electrode lead, 22 negative electrode lead, 25 internal terminal plate. 25a annular part. 25b center part, 25c vent hole, 26 external terminal plate, 26a vent part, 27 insulating plate, 27a opening, 27b vent hole, 30 grooved part, 30a inner end, 31 shoulder part, 32 facing part, 33 extending part, 34 readily deforming part, 35 groove, 36 step, 37 projection

The invention claimed is:

1. A cylindrical battery, comprising:
a bottomed cylindrical exterior can including a bottom surface part and a lateral surface part;
a sealing assembly closing an opening of the exterior can; and
a gasket arranged between the exterior can and the sealing assembly, wherein
the exterior can has a grooved part that is formed such that the lateral surface part is caused to project to an inside from an outside and that supports the sealing assembly via the gasket, and a shoulder part that is formed so as to face the grooved part via the sealing assembly and the gasket and that pinches and holds the sealing assembly together with the grooved part, and
at least part of the shoulder part extends more to an inner side of the sealing assembly in a radial direction than an inner end of the grooved part, and a readily deforming part is formed in the shoulder part along a circumferential direction of the exterior can,
the readily deforming part being any one or any combination of:
an annular groove extending along the circumferential direction, the annular groove defined by an annular section of the shoulder part thinner than a remainder of the shoulder part;
an annular step extending along the circumferential direction, the annular step defined by two adjacent annular sections, one thinner than the other, of the shoulder part; and
a base portion of one or more radial projections each arranged along an inner circumference of the shoulder part, wherein the radial projection extends radially inward from the base portion, with the base portion sandwiched between a pair of edge portions defining part of the inner circumference of the shoulder part radially outward from the radial projection.

2. The cylindrical battery according to claim 1, wherein the readily deforming part is formed in a range of a length corresponding to 50% of a length of the grooved part in the radial direction of the exterior can from a position on the shoulder part overlapping with the inner end of the grooved part in an axial direction of the exterior can as a center.

3. The cylindrical battery according to claim 1, wherein the readily deforming part is formed in a portion substantially overlapping with the inner end of the grooved part in the axial direction of the exterior can.

4. The cylindrical battery according to claim 1, wherein the shoulder part is inclined such that its distance from the grooved part becomes smaller as coming closer to the readily deforming part from an outermost periphery of the shoulder part.

5. The cylindrical battery according to claim 1, wherein a portion of the shoulder part positioned more on a tip side than the readily deforming part is formed to be parallel to the radial direction of the exterior can.

* * * * *